United States Patent
Kiel

[11] Patent Number: 6,112,713
[45] Date of Patent: Sep. 5, 2000

[54] DIESEL ENGINE PRE-HEATER

[76] Inventor: Lonn M. Kiel, Rt. 3, Box 71, Crookston, Minn. 56716

[21] Appl. No.: 09/140,816

[22] Filed: Aug. 26, 1998

[51] Int. Cl.[7] ........................................................ F02G 5/00
[52] U.S. Cl. ..................................... 123/142.5 R; 123/557
[58] Field of Search ............................ 123/142.5 R, 555, 123/557, 556

[56] References Cited

U.S. PATENT DOCUMENTS

| | | | |
|---|---|---|---|
| 1,064,782 | 6/1913 | Sherman | 123/555 |
| 1,083,673 | 1/1914 | Ellis | 123/555 |
| 1,563,608 | 12/1925 | Wood | 123/555 |
| 2,179,235 | 11/1939 | Silverstein | 123/555 |
| 3,667,436 | 6/1972 | Reichhelm | 123/555 |
| 3,698,992 | 10/1972 | Armand | 165/51 |
| 3,720,372 | 3/1973 | Jacobs | 237/12.3 B |
| 3,918,637 | 11/1975 | Kofink | 237/12.3 |
| 4,010,895 | 3/1977 | Kofink | 237/12.3 C |
| 4,095,575 | 6/1978 | Wolf | 123/142.5 R |
| 4,258,677 | 3/1981 | Sanders | 123/142.5 |
| 4,391,235 | 7/1983 | Majkrzak | 123/142.5 |
| 4,682,649 | 7/1987 | Greer | 165/43 |
| 4,685,430 | 8/1987 | Ap | 123/142.5 |
| 4,705,214 | 11/1987 | Johnson | 237/12.3 C |
| 4,756,359 | 7/1988 | Greer | 165/43 |
| 4,762,170 | 8/1988 | Nijjar et al. | 165/43 |
| 4,805,403 | 2/1989 | Bowman et al. | 60/320 |
| 4,884,744 | 12/1989 | Padgaonkar | 237/12.3 |
| 5,174,254 | 12/1992 | Humburg | 123/142.5 |
| 5,377,628 | 1/1995 | Adams | 123/43.31 |
| 5,551,384 | 9/1996 | Holis | 123/142.5 |
| 5,584,269 | 12/1996 | MacKenzie | 123/142.5 |

*Primary Examiner*—Marguerite McMahon
*Assistant Examiner*—Jason Benton
*Attorney, Agent, or Firm*—Curtis V. Harr

[57] ABSTRACT

A diesel engine pre-heater is provided that is connected within the diesel engine's exhaust system in a manner that forces the hot exhaust gases to pass directly through an internal chamber. Additionally, coolant from the engine's cooling system is routed through an internal network of passages within the heat exchanger. As the coolant flows through this system, the heat from the exhaust is transferred to the coolant which is then routed back to the diesel engine. The heated coolant then transfers its heat to the cold engine as it circulates, thus, greatly decreasing the time required to bring the engine up to operating temperature. Some of the coolant heated by the heat exchanger is also routed to the heater core of the cab's heating system. This allows the cab's heater to provide warm air to the interior cab of a truck much more quickly than a standard heating system. Additionally, the heat exchanger is also used to heat the diesel fuel before it enters the engine. This is accomplished routing the fuel through a shell on the outside of the heat exchanger which effectively warms the fuel to a temperature which ensures that the fuel will not gel, thereby enabling the fuel to flow efficiently at all temperatures.

11 Claims, 5 Drawing Sheets

DIESEL ENGINE PRE-HEATER

BACKGROUND OF THE INVENTION

The present invention relates to an improvement in the manner in which a diesel engine is brought to operating temperature during cold weather. More specifically, to an "add on unit" that will use the heat naturally generated by the engine's exhaust system to speed up the warming of the engine, the cab heater system and the diesel fuel. The present invention greatly reduces warm up time, thereby minimizing the excessive wear and tear caused to such engines in cold weather.

During cold winter months, especially in northern climates, when a diesel engine is first started it, may take a long period of time for the engine to reach operating temperature. This can be hard on the engine itself as it runs at a temperature lower than the ideal operating temperature. Further, an operator attempting to use the truck may find it difficult to defrost the windows as the heater core will typically not receive heat until the engine is up to operating temperature. This problem is also uncomfortable, as the cab may take a long period of time to reach a proper temperature.

For a diesel engine to operate efficiently it must maintain an internal temperature of 175 degrees Fahrenheit. If the temperature falls below this point it allows for the accumulation of water and sulfur in the engine. When a diesel engine is left to idle in cold weather, the operating temperature often drops ten or more degrees below the 175 degree point, thus, resulting in the above-described situation. This condition dilutes the engine oil, which increases engine wear due to the lack of lubrication, and can cause the engine valves to stick, which results in higher maintenance costs during the life of the engine.

Therefore, from the foregoing discussion it can be seen that it would be highly desirable to provide a method accelerating the process of bringing a diesel engine up to a proper operating temperature and of maintaining a diesel engine at a suitable temperature during cold weather idle periods.

Additionally, to provide such a system that will allow the heater core to receive heated coolant rapidly to accelerate the cabs heater and window defrosting system.

Additionally, it is desirable to provide such a system that may also be used to preheat the diesel fuel for increased mileage and optimal burn.

The present invention addresses these problems by providing a diesel engine pre-heater that is attached to the exhaust line after the turbo charger on a diesel engine. This pre-heater is also connected the cooling system and fuel system of the engine.

SUMMARY OF THE INVENTION

Therefore, it is the primary objective of the present invention to provide a method of heating the coolant used in a diesel truck engine quickly during warm-up in cold weather conditions, thereby, greatly reducing the time it takes for such engines to reach operating temperatures.

It is an additional objective of the present invention to provide heat to the truck's cab heater system by again quickly heating the diesel engine's coolant which is used as a heat source in said cab heaters.

It is a further objective of the present invention of providing a means by which the diesel fuel used in such applications can be heated to help to avoid the gelling problems commonly encountered when using diesel fuel in cold weather conditions.

These objectives are accomplished by the use of a heat exchanger that is connected within the diesel engine's exhaust system in a manner that forces the hot exhaust gases to pass directly through an internal chamber. Additionally, coolant from the engine's cooling system is routed through an internal network of passages within the heat exchanger. As the coolant flows through this system, the heat from the exhaust is transferred to the coolant which is then routed back to the diesel engine. The heated coolant then transfers its heat to the cold engine as it circulates, thus, greatly decreasing the time required to bring the engine up to operating temperature.

Some of the coolant heated by the heat exchanger is also routed to the heater core of the cab's heating system. This allows the cab's heater to provide warm air to the interior cab of a truck much more quickly than a standard heating system. Additionally, the heat exchanger is also used to heat the diesel fuel before it enters the engine. This is accomplished by routing the fuel through a shell on the outside of the heat exchanger, which effectively warms the fuel to a temperature which ensures that the fuel will not gel, thereby enabling the fuel to flow efficiently at all temperatures.

For a better understanding of the present invention reference should be made to the drawings and the description in which there are illustrated and described preferred embodiments of the present invention.

DESCRIPTION OF THE PREFERRED EMBODIMENT

Figure 1:
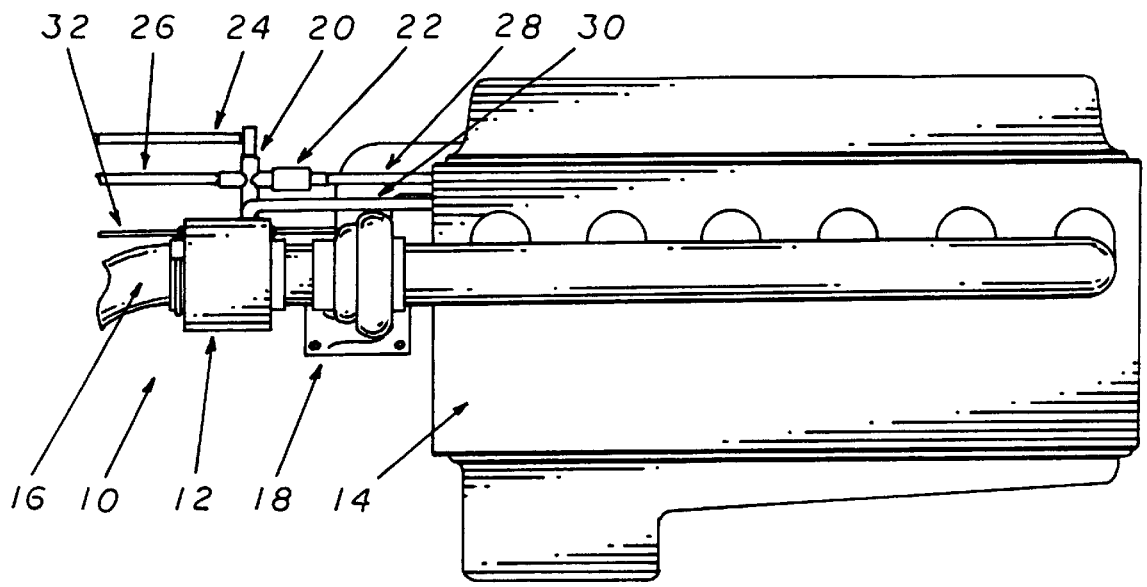
FIG. 1 is a side elevation view of the present invention as installed on a typical diesel engine showing the general orientation of the major components with respect to said diesel engine.
Figure 2:
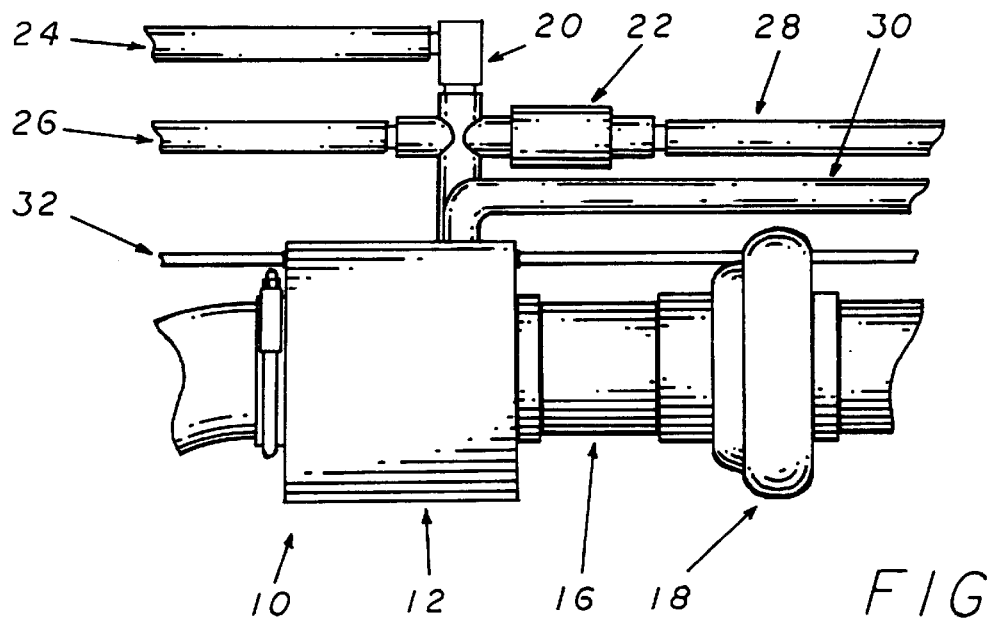
FIG. 2 is a side elevation view of the present invention detailing the construction of said invention and showing its major components and the manner in which they are interconnected within the system.

Referring now to the drawings, and more specifically to FIGS. 1 and 2, the diesel engine pre-heater 10 comprises a heat exchange box 12 that installs in the existing exhaust system 16 of a diesel engine 14 behind the turbo charger 18. This design channels the hot exhaust gases produced by the engine 14 through a chamber within the heat exchange box 12. After passing through the heat exchanger 12 the exhaust gases then are simply channeled back into the exhaust system 16 where they are discharged as in a normal system.

Coolant from the diesel engine 14 is routed into the heat exchange box 12 by means of the coolant line from the engine 30. Once the coolant enters the heat exchanger 12, it is circulated through it and then pass out into the control valve 20 situated on top of the heat exchanger 12. The control valve 20 directs the flow of coolant to the various components of the system depending on the temperature of the coolant. When the coolant is below 180 degrees Fahrenheit, the thermostat 22 located on the direct engine return line 28 remains closed and the heated coolant is directed to the heated return line 26 and the cab heater line 24.

This system quickly supplies heated coolant to the diesel engine 14, which greatly decreases the time required to bring the diesel engine 14 to operating temperature, and the cab heater, which greatly reduces the time necessary to heat the cab of a truck. When the coolant reaches the temperature of 180 degrees Fahrenheit, the thermostat 22 will then open and allow coolant to pass directly back to the diesel engine 14. It is important to note that even when the thermostat 22 is in the open position coolant will still flow to the cab heater line 24 to supply the cab with heat.

Additionally, diesel fuel is heated by the diesel engine pre-heater 10 by passing the fuel through the outer shell of heater exchange box 12. This is accomplished by attaching the fuel line 32 to the heater exchange box 12 prior to its entering the diesel engine 14. This design ensures that the fuel will flow efficiently to the engine 14 by eliminating the problem of fuel gelling that so frequently occurs during the operation of diesel engines 14 in cold temperatures.

Figure 3:
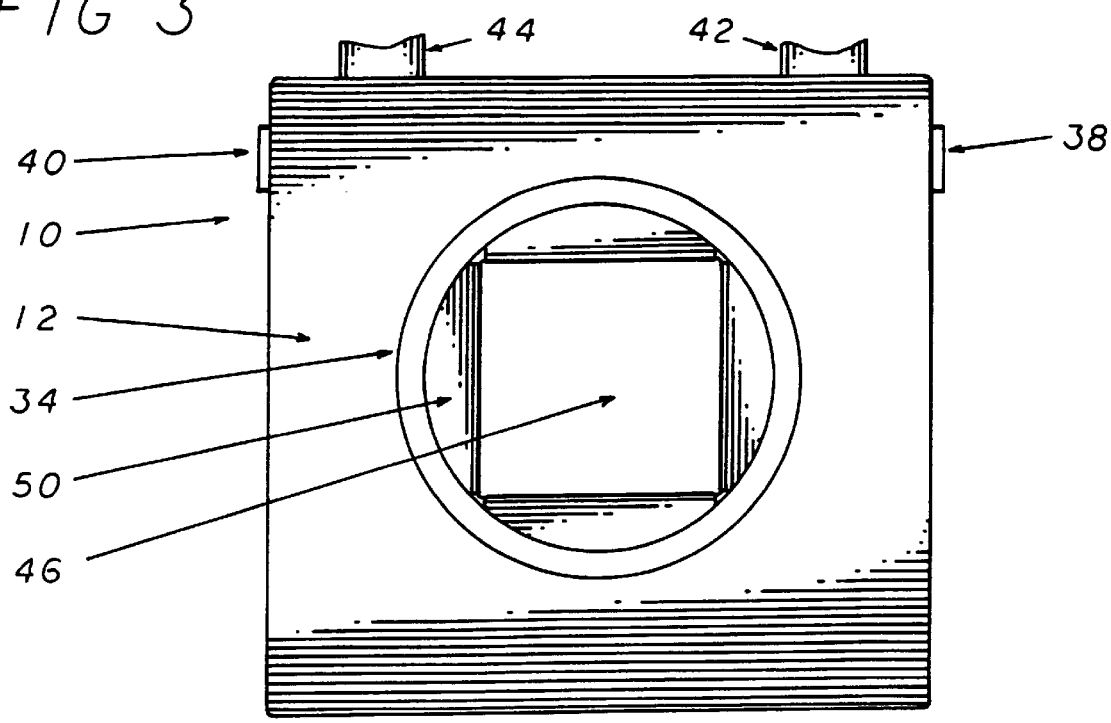
FIG. 3 is a front elevation view of the present invention showing the manner in which exhaust gases enter the body to heat the coolant contained therein.
Figure 4:
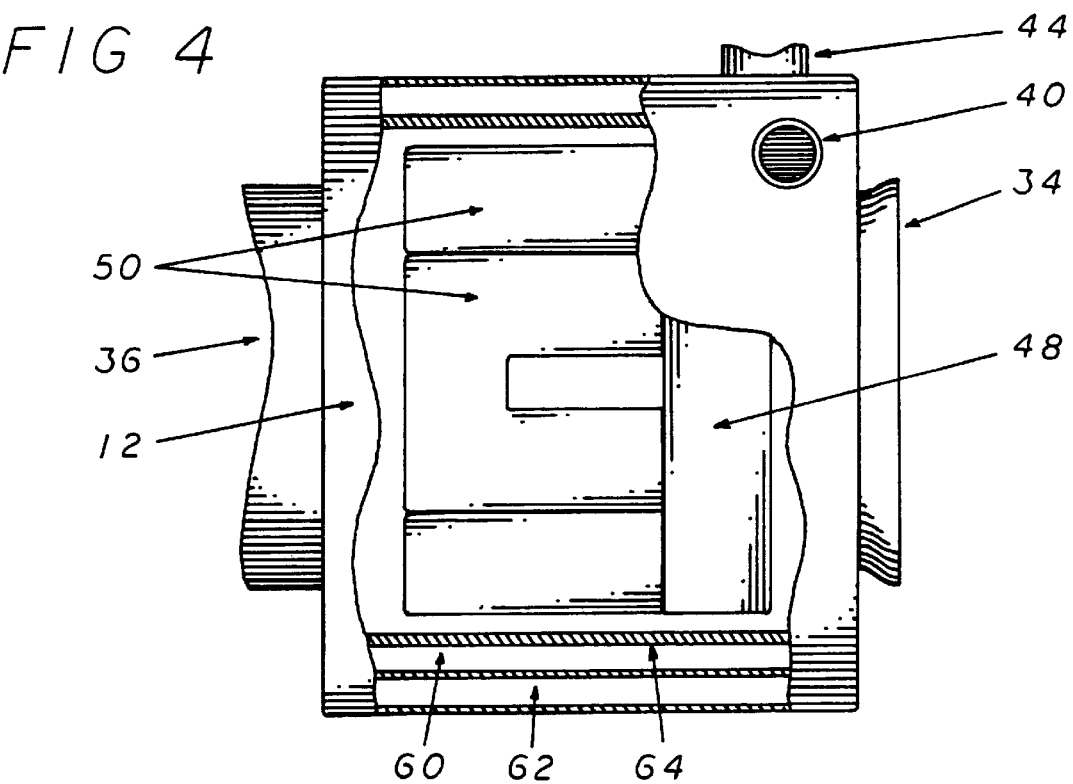
FIG. 4 is a side elevation cut-away view of the present invention detailing the interior construction of said invention and the way the surface area of the interior coolant passages are maximized.
Figure 5:
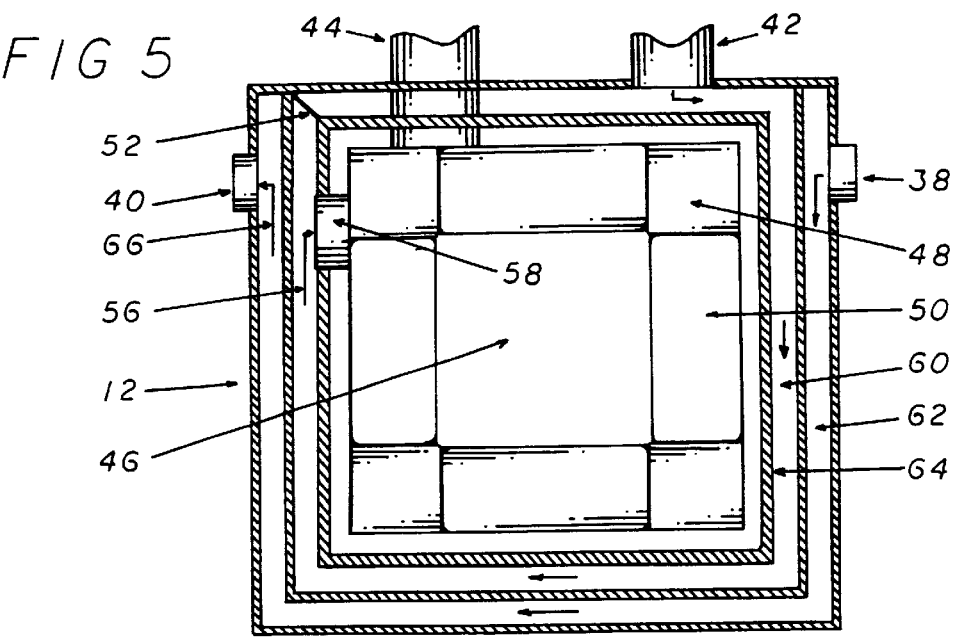
FIG. 5 is a front elevation cut-away view of the present invention detailing the manner of construction of the coolant and fuel shells around the outer surface of the interior heat exchange chamber.

The internal structure of the heat exchange box 12 is shown by FIGS. 3, 4 and 5. The exhaust gases enter the heat exchange box 12 through the exhaust in port 34, to which the exhaust system 16 is attached, and enters the heat chamber 46. When in the heat chamber 46, the hot exhaust gases encircle the coolant extension tubes 50 and the coolant flow tubes 48. It is here that the heat from the exhaust gases is transferred to the coolant. Once passing through the heat chamber 46, the exhaust gases pass out the back of the heat exchange box 12 through the exhaust out port 36 and continue in their normal path through the exhaust system 16.

Coolant enters the heat exchange box 12 through the coolant shell in port 42. Once it enters, the coolant passes through the coolant shell 60 (as illustrated by the coolant flow arrows 56 on the figures) which encloses the outer surface 64 of the heat chamber 46 and then passes through the flow tube inlet 58 to the coolant flow tube 48 within the heat chamber 46. After flowing through the coolant flow tubes 48, the now heated coolant passes out of the heat exchange box 12 through the coolant out port 44 where it is diverted to the desired location of the cooling system by the control valve 22.

The heat exchange box 12 also has constructed on its outer most surface a fuel heater shell 62 through which fuel for the diesel engine 14 is passed. The diesel fuel enters the fuel heater shell 62 through the fuel in port 38 where it travels along the fuel heater shell 62 (as indicated by the fuel flow arrows 66 on the diagrams) until it passes out the fuel out port 40 and return to the fuel line 32.

Additionally, both the fuel heater shell 62 and the coolant shell 60 act as an external insulator for the heat exchange box 12 which limits external heat build up of the system. It is important to note the temperature of the diesel fuel passing through the heat exchange box is limited to approximately 90 degrees Fahrenheit (well below its flash point) because it is insulated from the great heat of the heat exchange box 12 by the coolant shell 60 and the fact that it passes relatively quickly through it as it travels to the diesel engine 14.

Figure 6:
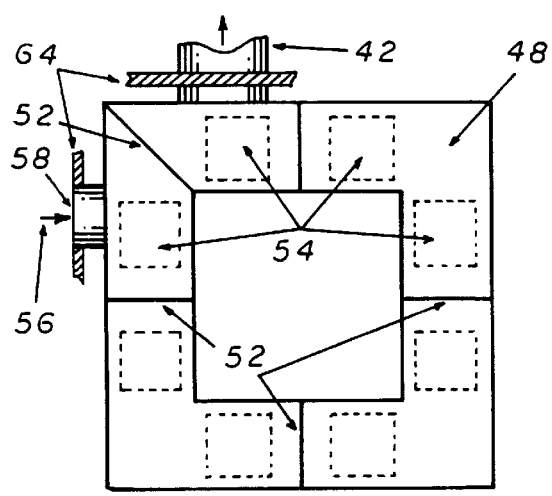
FIG. 6 is a front elevation cut-away view of the coolant tubes of the present invention detailing the manner in which they are constructed to channel coolant flow through them to transfer the heat from the exhaust to said coolant.
Figure 7:
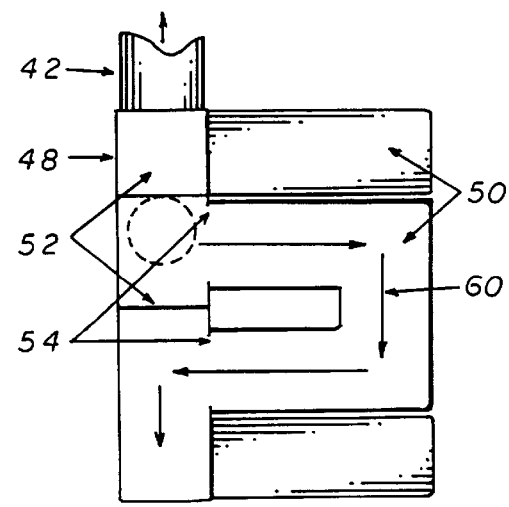
FIG. 7 is a side elevation cut-away view of the coolant tubes of the present invention detailing the manner in which they are constructed to channel coolant flow through them to transfer the heat from the exhaust to said coolant.

The path that the coolant follows through the coolant flow tube 48 and the coolant extension tubes 50 is illustrated by FIGS. 6 and 7. As coolant enters the coolant flow tube 48 through the flow tube inlet 58, it is channeled through the flow tube and into a plurality of coolant extension tubes 50 by a series of flow diverters 52. These serve to block the flow of the coolant along the flow tube 48 and force it to enter the coolant extension tubes 50 through the coolant passages 54. The coolant extension tubes 50 are U-shaped passages which extend out from the flow tube 48 and channel the coolant around this U and back into the flow tube 48. This process is repeated three more times before the coolant exits the heat exchange box 12 through the coolant out port 44. The purpose of the coolant extension tubes 50 is to increase the surface area at which the coolant is in contact with the heat of the exhaust gases which greatly increases the efficiency of the heat exchanger 12 by optimizing the amount of heat passed to the coolant.

Figure 8:
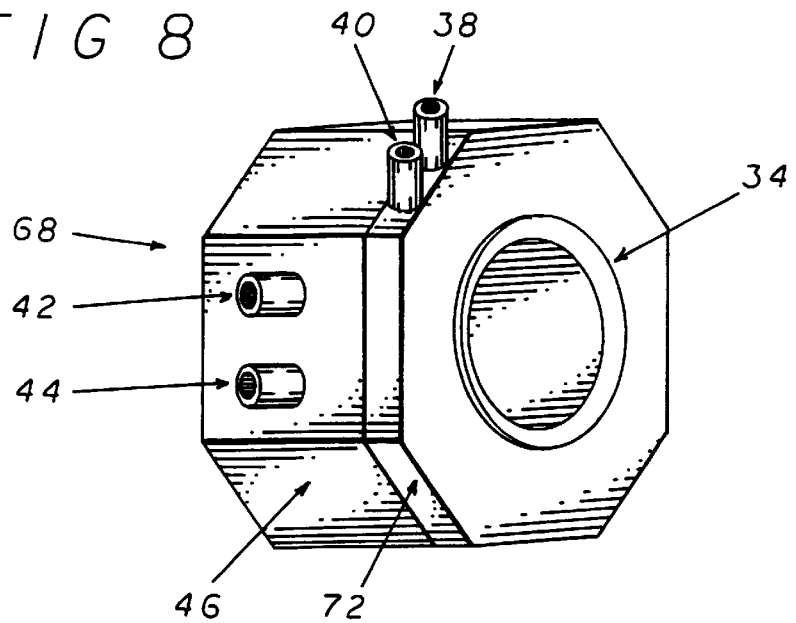
FIG. 8 is a perspective of an alternative embodiment of the present invention showing its general manner of construction and its major external components.
Figure 9:
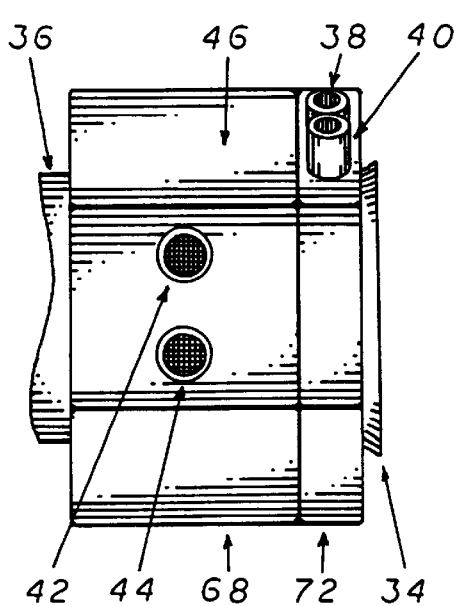
FIG. 9 is a side elevation view of an alternative embodiment of the present invention showing its general configuration and the location of the coolant and fuel inlet tubes.
Figure 10:
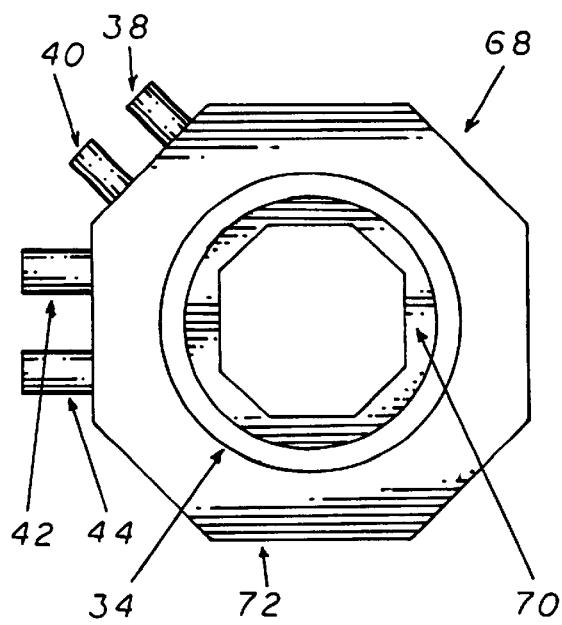
FIG. 10 is a front elevation view of an alternative embodiment of the present invention showing its general configuration and the location of the heat exchange tube within the heat exchange chamber.

An alternative embodiment of the present invention is illustrated in FIGS. 8, 9 and 10. The octagonal heat exchange box 68 installs and operates in a typical diesel engine 14 in much the same manner as the heat exchange box 12 as previously discussed. The exhaust system 16 of the diesel engine 14 conducts the exhaust into the octagonal heat exchange box 68 through the exhaust in port 34 where it surrounds the octagonal coolant flow tube 70 before returning to the exhaust system 16 through the exhaust out port 36 at the rear of the octagonal heat exchange box 68.

The octagonal heat exchange box 68 is also used to preheat diesel fuel by providing an octagonal fuel cell 72 located at the front of the octagonal heat exchange box 68. Unlike the corresponding feature of the previous embodiment, the octagonal fuel cell does not cover the entire outside a surface of the octagonal heat exchange box 68, but rather, it is a relatively narrow chamber that extends from the outer surface to the exhaust in port 34. This design provides enough heat to the fuel to ensure that it remains in a fluid, free flowing state even in the coldest weather.

Figure 11:
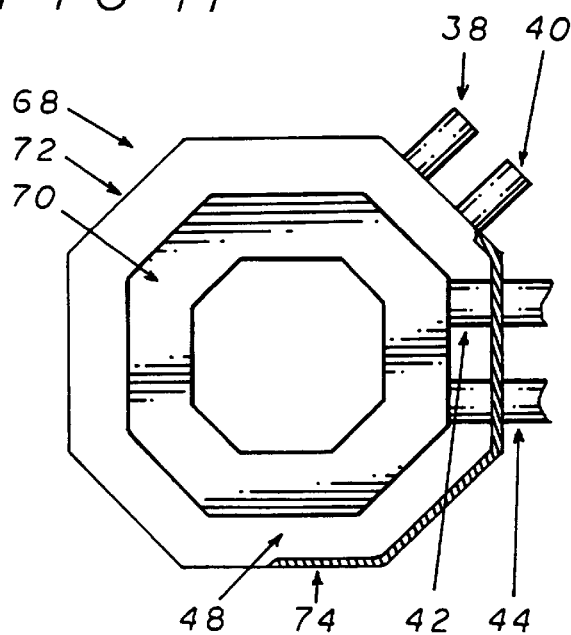
FIG. 11 is a rear elevation cut-away view of an alternative embodiment of the present invention showing the location of the heat exchange tube within the heat exchange chamber.
Figure 12:
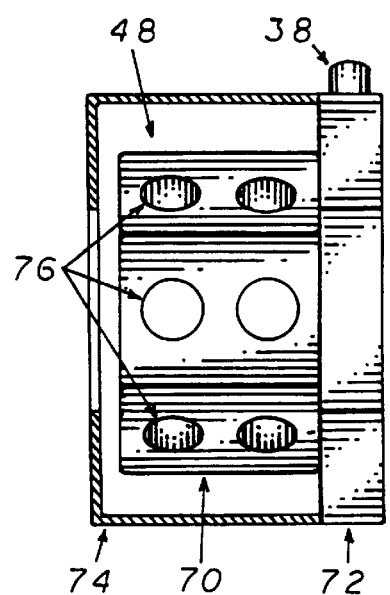
FIG. 12 is a side elevation cut-away view of an alternative embodiment of the present invention showing the location of the heat exchange tube and the heat exchange passages on the tube.

The internal structure and manner of operation of the octagonal heat exchange box 68 are illustrated in FIGS. 11 and 12. The outer surface of the octagonal heat exchange box 68 is made up of the octagonal heat shell 74 which forms the enclosed heat chamber 48 into which the hot exhaust gases flow. The heat chamber 48 houses the octagonal coolant flow tube 70 through which the diesel engine's 14 coolant fluid flows prior to being diverted to the desired points by the present invention. The surface area of the octagonal coolant flow tube 70 is maximized by having a plurality of flow tube heat exchange passages 76 that extend from the outside to inside surfaces of the coolant flow tube 70. As the exhaust gases circulate through the heat chamber 48 and the flow tube heat exchange passages 76, the heat that they contain is transferred to the coolant flowing through the octagonal coolant flow tube 70, thus, providing an effective way of heating the coolant during early engine warmup periods.

Figure 13:
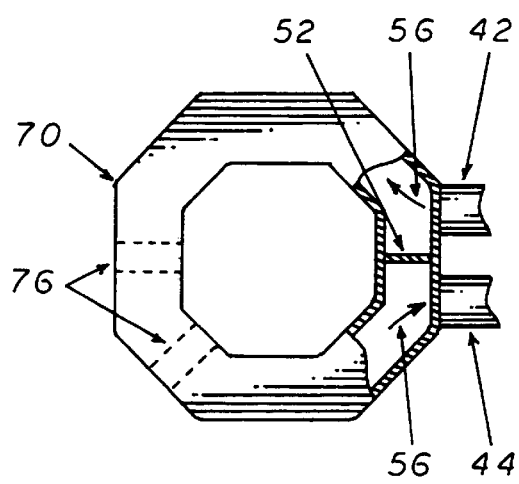
FIG. 13 is a front elevation cut-away view of the heat exchange tube of an alternative embodiment of the present invention showing the manner in which the coolant enters and flows through the tube.
Figure 14:
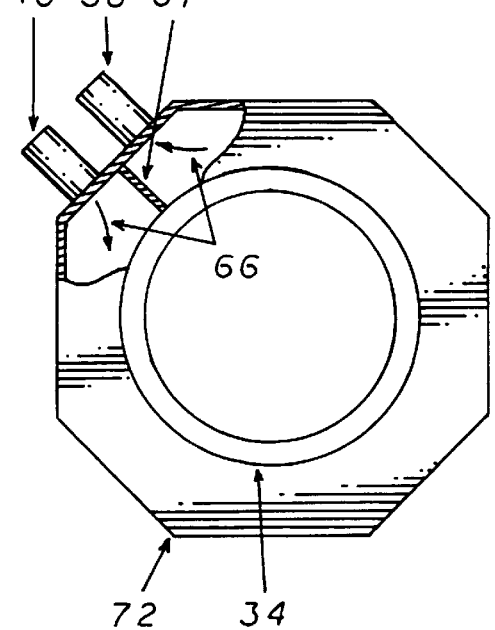
FIG. 14 is a front elevation cut-away view of the fuel heating cell of an alternative embodiment of the present invention showing the manner in which fuel enters and flows through the cell.

The flow of the engine coolant and diesel fuel through the octagonal coolant flow tube 70 and the octagonal fuel cell 72 are illustrated in FIGS. 13 and 14. Engine coolant enters the octagonal coolant flow tube 70 through the coolant in port 42 where it is diverted around the length of the flow tube 70 by the coolant flow diverter 52 (the direction of flow of the coolant is indicated by coolant flow directional arrow 56). After completing its passage through the octagonal coolant flow tube 68, the heated coolant again encounters the coolant flow diverter 52 which forces it into the coolant out port 44 where it reenters the original cooling system.

The fuel is heated by the octagonal heat exchange box 68 in much the same manner. The fuel enters the octagonal fuel cell 72 where the flow is diverted by the fuel flow diverter 67 (the direction of flow of the fuel is indicated by the fuel flow arrow 66). While the fuel is in the octagonal fuel cell 72, it is heated by the fuel cell's 72 contact with the heat chamber 48 sufficiently to eliminate gelling problems typically encountered in cold weather conditions. After completing its passage through the fuel cell 72, the heated fuel is directed back to the original fuel system through the fuel out port 40 by the fuel flow diverter 67.

Although the present invention has been described in considerable detail with reference to certain preferred versions thereof, other versions are possible. Therefore, the spirit and scope of the appended claims should not be limited to the description of the preferred versions contained herein.

What is claimed is:

1. A diesel engine pre-heater system for use in combination with a motor vehicle, the motor vehicle having an engine with a cooling system including a heater core, a radiator, and lines for connecting in a fluid tight arrangement with the heater core, radiator and engine, an exhaust system including an exhaust pipe for conveying exhaust gas away from the engine, and a fuel system including a line to carry fuel to said engine said engine pre-heater system comprising:

a partially hollow heat exchange box for connection in line with said exhaust pipe so that said exhaust gas flows through said heat exchange box;

a hollow shell about part of said heat exchange box said shell having an inlet and outlet port for connection in line with said fuel line so that fuel travels between said shell and said heat exchange box prior to entering said engine; and a system of coolant flow tubes inside of said heat exchange box said coolant flow tubes having an inlet and outlet port connected to said cooling system.

2. A diesel engine pre-heater system as in claim 1 wherein said heat exchange box is substantially rectangular in shape.

3. A diesel engine pre-heater system as in claim 1 wherein said heat exchange box is substantially octagonal in shape.

4. A diesel engine pre-heater system as in claim 1 further comprising a control valve with a thermostat connected to said coolant flow outlet port.

5. A diesel engine pre-heater system as in claim 4 wherein said control valve directs coolant to said heater core.

6. A diesel engine pre-heater system for use in combination with a motor vehicle, the motor vehicle having an engine with a cooling system including a heater core, a radiator, and lines for connecting and a fluid tight arrangement with the heater core, radiator and engine, an exhaust system including an exhaust pipe for conveying exhaust gas away from the engine, and a fuel system, including a line to carry fuel to said engine said engine pre-heater system comprising:

a partially hollow substantially rectangular heat exchange box for connection in line with said exhaust pipe so that said exhaust gas flows through said heat exchange box;

a hollow shell about said heat exchange box said shell having an inlet and outlet port for connection in line with said fuel line so that fuel travels between said shell and said heat exchange box prior to entering said engine; and a system of coolant flow tubes inside of said heat exchange box said coolant flow tubes having an inlet and outlet port connected to said cooling system.

7. A diesel engine pre-heater system as in claim 6 further comprising a control valve with a thermostat connected to said coolant flow outlet port.

8. A diesel engine pre-heater system as in claim 7 wherein said control valve directs coolant to said heater core.

9. A diesel engine pre-heater system for use in combination with a motor vehicle, the motor vehicle having an engine with a cooling system including a heater core a radiator and lines for connecting and a fluid tight arrangement with the heater core, radiator and engine, an exhaust system including an exhaust pipe for conveying exhaust gas away from the engine, and a fuel system including a line to carry fuel to said engine said engine pre-heater system comprising:

a partially hollow, substantially octagonal heat exchange box for connection in line with said exhaust pipe so that said exhaust gas flows through said heat exchange box;

a hollow shell about part of said heat exchange box said shell having an inlet and outlet port for connection in line with said fuel line so that fuel travels between said shell and said heat exchange box prior to entering said engine; and a system of coolant flow tubes inside of said heat exchange box said coolant flow tubes having an inlet and outlet port to said cooling system.

10. A diesel engine pre-heater system as in claim 9 further comprising a control valve with a thermostat connected to said coolant flow outlet port.

11. A diesel engine pre-heater system as in claim 10 wherein said control valve directs coolant to said heater core.

* * * * *